(12) United States Patent
Ford et al.

(10) Patent No.: US 11,113,320 B2
(45) Date of Patent: Sep. 7, 2021

(54) VERSIONED CHANGE PROPAGATION

(71) Applicant: HERE Global B.V., Veldhoven (NL)

(72) Inventors: Paul Ford, Oak Park, IL (US); Michael Weiland, Gurnee, IL (US)

(73) Assignee: HERE Global B.V., Eindhoven (NL)

( * ) Notice: Subject to any disclaimer, the term of this patent is extended or adjusted under 35 U.S.C. 154(b) by 544 days.

(21) Appl. No.: 14/576,869

(22) Filed: Dec. 19, 2014

(65) Prior Publication Data

US 2016/0179841 A1 Jun. 23, 2016

(51) Int. Cl.
*G06F 16/00* (2019.01)
*G06F 16/29* (2019.01)
*G01C 21/00* (2006.01)
*G06F 16/21* (2019.01)

(52) U.S. Cl.
CPC ............. *G06F 16/29* (2019.01); *G01C 21/00* (2013.01); *G06F 16/213* (2019.01)

(58) Field of Classification Search
CPC ....... G06F 16/213; G06F 16/29; G01C 21/00; G01C 21/3859; G01C 21/387
USPC .................................................. 707/600–899
See application file for complete search history.

(56) References Cited

U.S. PATENT DOCUMENTS

| | | | |
|---|---|---|---|
| 5,893,113 A | 4/1999 | McGrath et al. | |
| 6,121,924 A | 9/2000 | Meek et al. | |
| 6,601,073 B1 | 7/2003 | Robare | |
| 7,031,974 B1* | 4/2006 | Subramaniam | G06F 16/27 |
| 7,082,443 B1 | 7/2006 | Ashby | |
| 7,099,882 B2 | 8/2006 | McDonough | |
| 7,403,851 B2 | 7/2008 | Kaufman et al. | |
| 7,653,668 B1* | 1/2010 | Shelat | G06F 16/184 |
| | | | 707/610 |
| 8,310,361 B1* | 11/2012 | Stout | G08B 27/005 |
| | | | 340/539.11 |
| 8,521,430 B2 | 8/2013 | Davis et al. | |
| 9,600,501 B1* | 3/2017 | Fuller | G06F 16/27 |
| 9,740,713 B1* | 8/2017 | Greenwood | G06F 16/213 |
| 2003/0088654 A1* | 5/2003 | Good | H04L 29/12132 |
| | | | 709/223 |
| 2003/0115211 A1* | 6/2003 | Chen | G06F 16/283 |
| 2004/0030707 A1* | 2/2004 | Lu | G06F 16/27 |
| 2004/0034666 A1* | 2/2004 | Chen | G06F 16/29 |
| 2004/0034669 A1* | 2/2004 | Smith | G06F 16/273 |
| 2005/0102314 A1* | 5/2005 | Howard | G06F 17/30595 |
| 2005/0195735 A1* | 9/2005 | Brady | G06F 16/273 |
| | | | 370/216 |

(Continued)

*Primary Examiner* — Michelle N Owyang
(74) *Attorney, Agent, or Firm* — Lempia Summerfield Katz LLC (57) ABSTRACT

A map developer may maintain multiple versions of a geographic database. Example systems and methods manage the propagation of updates to the multiple versions of the geographic databases even when structural (schema) changes have been made between database versions. A computing device identifies a first geographic database with a first schema, and the computing device identifies a second geographic database with a second schema. The second geographic database is a later version of the first geographic database. The computing device applies an update to the first geographic database and applies the update to the second geographic database according to a rule for a difference between the first schema and the second schema.

19 Claims, 8 Drawing Sheets

(56) References Cited

U.S. PATENT DOCUMENTS

| | | | | |
|---|---|---|---|---|
| 2006/0074547 A1* | 4/2006 | Kaufman | ............... | G01C 21/32 |
| | | | | 701/451 |
| 2007/0150188 A1* | 6/2007 | Rosenberg | ......... | G01C 21/3647 |
| | | | | 701/431 |
| 2007/0260628 A1* | 11/2007 | Fuchs | ............... | G06F 17/30241 |
| 2009/0171558 A1* | 7/2009 | Davis | .................... | G01C 21/32 |
| | | | | 701/532 |
| 2011/0029489 A1* | 2/2011 | Zhao | ................. | G06F 17/30489 |
| | | | | 707/648 |
| 2012/0209818 A1 | 8/2012 | Richter et al. | | |
| 2014/0344400 A1* | 11/2014 | Varney | ................. | H04L 45/745 |
| | | | | 709/217 |

\* cited by examiner

|  | Qtr 1 | Qtr 2 | Qtr 3 | Qtr 4 | Qtr 1 |
|---|---|---|---|---|---|
| User A | V1 | V2 | V3 | V4 | V5 |
| User B | V1 | V1 | V1 | V1 | V5 |
| User C | V1 | V1 | V3 | V3 | V5 |
| User D | V1 | V1 | V1 | V1 | V1 |

VERSIONED CHANGE PROPAGATION

FIELD

The following disclosure relates to map updates, and more particularly to map updates of a geographic database based on changes propagated through different versions of the geographic database.

BACKGROUND

Map databases or geographic databases are used in computer based systems that provide useful features to users. For example, the identification of routes to destinations or points of interests. A navigation system determines the optimum route to be taken by the end user to travel from the origin to the destination location from map data stored in a map database. Similarly, the navigation system may query the map database for nearby points of interest.

As new roads are built, other roads are closed, or locations of business are changed, the geographic database is updated. One way to update map data is to replace the entire existing map database with a new version of the map database containing new, updated map data. Another way to update map data is to update certain aspects of the map database incrementally.

In both examples, situations may arise in which different versions of the map are maintained in parallel. In one situation, different users (e.g., website or navigation application providers) elect to take map database updates on a specific schedule or delivery cadence. In one situation, the development of major database updates may require more time than the desired interval between scheduled map database releases. When different versions of the map databases are maintained in parallel, challenges remain in the development of techniques for facilitated compatibility between the different versions.

SUMMARY

In one embodiment, a first geographic database is updated to a second geographic database at a first time with a schema change, and separately updated to a third geographic database at a second time with a first map data change. The schema change relates to the type of data includes in the database, and the map data change relates to the data value. The second time is later than the first time. A second map data change is identified. A computing device propagates the second map data change to the third geographic database without the schema change and propagates the second map data change to the second geographic database with the schema change.

In one embodiment, a computing device identifies a first geographic database with a first schema and a second geographic database with a second schema. The second geographic database is a later version of the first geographic database. The computing device applies an update to the first geographic database and applies the update to the second geographic database according to a rule for difference between the first schema and the second schema.

BRIEF DESCRIPTION OF THE DRAWINGS

Exemplary embodiments of the present invention are described herein with reference to the following drawings.

DETAILED DESCRIPTION

A geographic database may be made up of schema and values. The schema, or schemas, are the structure of the database or a blueprint of the database. The various fields that make up the schemas contain data or values. In other words, the schemas define the types of data, and the values are the data itself. Some database updates involve the schemas and other geographic database updates involve the values.

In some examples, separate versions of geographic databases are maintained by a map developer. In some examples, different users or customers may use geographic database versions having different schemas. Consider a scenario in which a version of the geographic database is released by the map developer every quarter. Some entities may update the geographic database as frequently as possible and request the quarterly updates every quarter from the map developer. Other entities may request updates semiannually or annually.

Figure 1A:
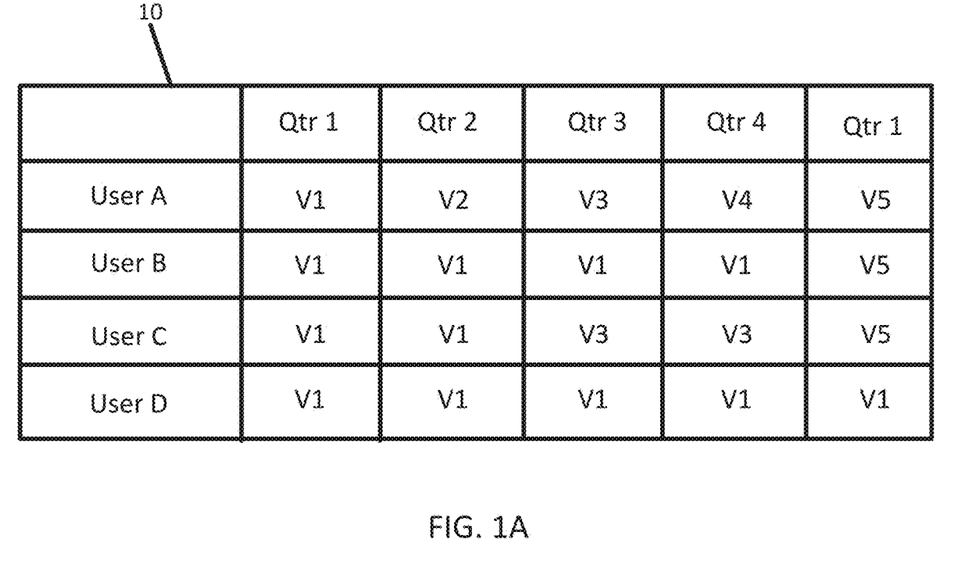
FIG. 1A illustrates an example map version schedule for a map database.

FIG. 1A illustrates a scenario in which the map developer updates the database every quarter. Successive versions are labeled V1, V2, and so on each quarter. As shown by the chart, the database for User A is updated every quarter, the database for User B is updated annually, at the first quarter, the database for User C is updated semiannually (e.g., in the first and third quarters of each year), and the database for user D is updated at an interval greater than five quarters. If these were the only updates for the master database of the map developer, the varying schedules of the users would cause no problems. However, intermediate updates to the master database occur. The intermediate updates may be limited to high priority updates. When a high priority update occurs between quarters, the high priority update should be added to all existing databases in use. The high priority updates may include a change to a high functional class road, a change to a national airport, a change to a hospital, or another feature. The intermediate updates may include other types of updates or all updates to the map database.

Consider the schedule of FIG. 1A. In quarter 1, all the users have the same database, V1. However, in quarter 2, one user switches to V2. In quarter 3, some of the users are on V3 and others remain on V1. In quarter 4, one user switches to V4, another is on V3, and others remain on V1. In each of these quarters, in order to reach all of the users, an intermediate update must be applied to multiple database versions. When the schema in all the versions is the same, this process may be straight forward. Segment X can be added to V1 and V3 of the database in a similar fashion.

However, when one or more fields are added, removed or replaced in the database schema the process becomes more complicated. Consider an example where an attribute is added to the road segments. In V1 of the database, road segments have attributes including speed limit and functional class. In V2, a vehicle type attribute is added to the road segments. The vehicle type attribute lists types of vehicles permitted on the road segment.

An intermediate update for a road segment that has recently been built or moved cannot be the same for both V1 and V2. In V1 the new road segment has attributes for speed limit and functional class. In V2 the new road segment has attributes for speed limit, functional class, and vehicle type. A mechanism is needed to reconcile schema changes for intermediate updates.

Figure 1B:
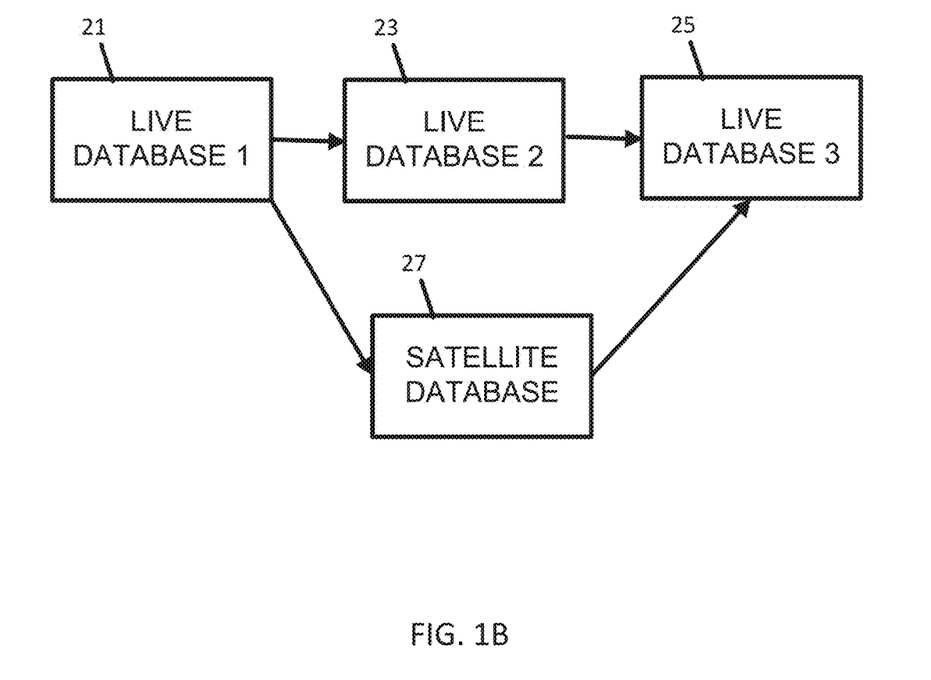
FIG. 1B illustrates an example version hierarchy.

FIG. 1B illustrates an example version hierarchy. A master database or a live database may sequence between versions 21, 23, and 25, or live database 1, live database 2, and live database 3, respectively. A satellite database 27 is used for major projects in isolation of the live database. For example, the live database includes major roads for a country, but no detailed local roads or points of interest. The satellite database 27 is used to add points of interest and all roads to a particular geographic region (e.g., a city). Such an update is time consuming. However, the update made in the satellite database 27 should be completed before it is released in the live database. Accordingly, while the geographic region is being updated in the satellite database 27, other updates have occurred to the major roads of the live database. The live database proceeds from live database 1, to live database 2, to live database 3 while the geographic region is being updated in satellite database 27. Live database 3 and the satellite database 27 cannot be directly merged. Conflicts may be caused from changes in live database 2 and live database 3.

The following embodiments manage map updates across multiple versions of the database. In some examples, changes to the map database are propagated to the live database and the satellite database in parallel. In other examples, changes made in one version of a database are propagated to earlier and/or different versions of the database. In some examples, several versioned layers of the database are maintained. Changes may propagated among the layers forward in time and backward in time or version sequence. A forward propagation refers to a change from an earlier (lower version number) database to a newer (higher version number) database. A reverse propagation refers to a change from a newer database to an earlier database.

Figure 2:
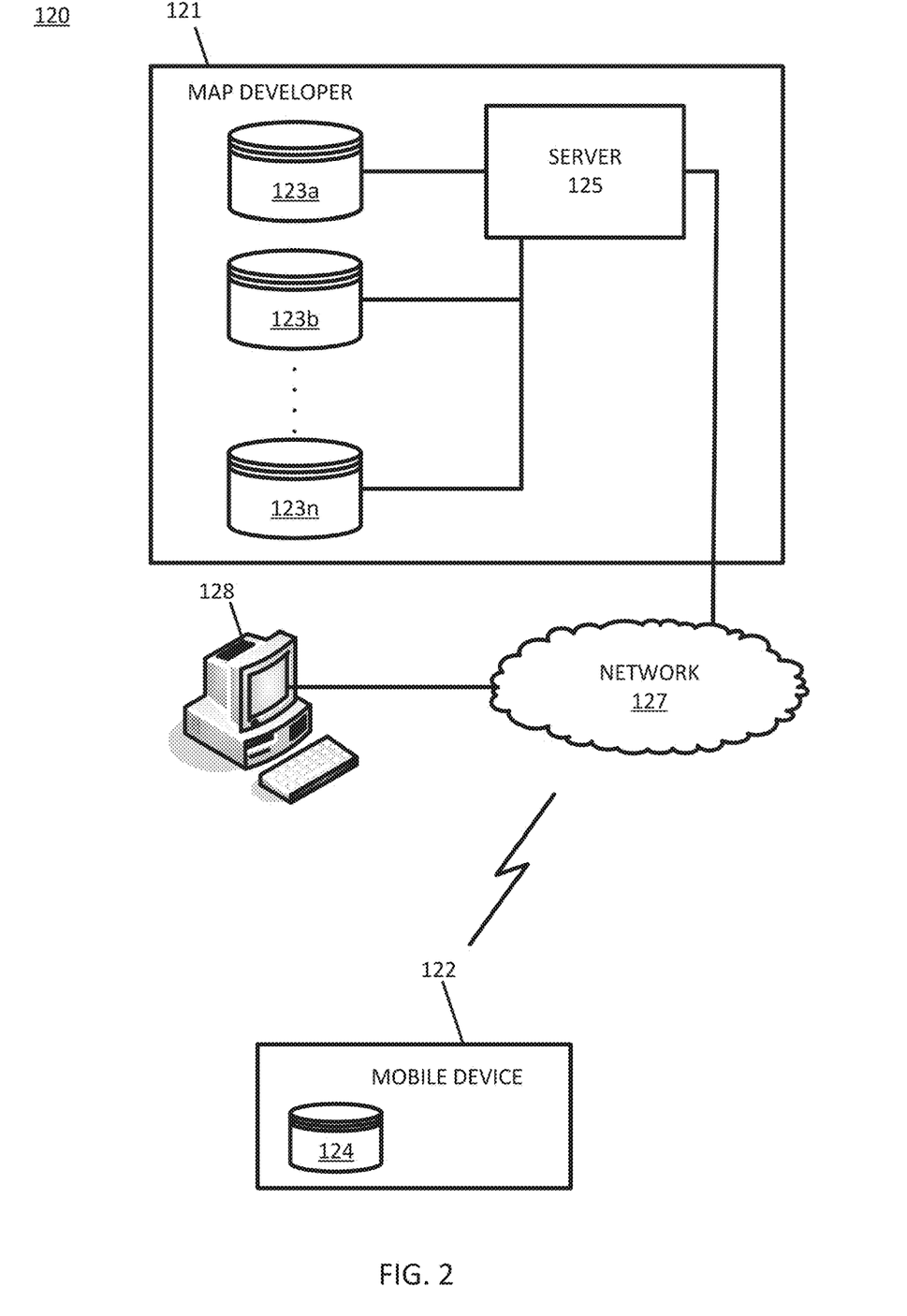
FIG. 2 illustrates an example system for versioned change propagation.

FIG. 2 illustrates an example map developer system 120 for updating navigation databases. The system 120 includes a developer system 121, one or more mobile devices 122 (navigation devices), a workstation 128, and a network 127. Additional, different, or fewer components may be provided. For example, many mobile devices 122 and/or workstations 128 connect with the network 127. The developer system 121 includes a server 125 and one or more databases. The server 125 may maintain multiple databases 123a, 123b . . . 123n. The term server 125 is used herein to collectively include the computing devices at the map developer for creating, maintaining, and updating the multiple databases 123a-n. Any computing device may be substituted for the mobile device 122. The computing device may be a host for a website or web service such as a mapping service or a navigation service. The mapping service may provide maps generated from the geographic data of the databases 123a-n, and the navigation service may calculate routing or other directions from the geographic data of the databases 123a-n.

The database 123a-n may be a geographic database including road segments. As shown in FIG. 2, a master copy of the database 123a may be stored at the developer system 121, and the databases 123b-n may be satellite versions or past versions of the database. In addition, the mobile device 122 may store a local copy of the database 124. In one example, the local copy of the database 123b is a full copy of the geographic database, and in another example, the local copy of the database 124 may be a cached or partial portion of the geographic database. The cached portion may be defined based on a geographic location of the mobile device 122 or a user selection made at the mobile device 122. The server 125 may send map updates to the mobile device 122.

The master copy of the database 123a or live version of the database may be updated continuously or in small intervals. The master copy of the database 123a may be used by a cloud service (e.g., a map or navigation website, or a map or navigation mobile application). Thus, the database always has the most current version of the schema and values for the database.

The master copy of the database 123a (first geographic database) may be updated in two paths to form two independent updated databases. One of the two paths may be a satellite database formed for a long term project. One of the two paths may be a successive update of the database (e.g., quarterly updates). One of the two paths may be priority or intermediate updates. One of the updates involves a schema change.

The server 125 is configures to update the database 123 to a second geographic database at a first time with a schema change, and the server 125 is configured to update the first geographic database to a third geographic database at a second time with a first map data change. In other words, the database 123 is updated in two paths. In one path, the schema is changed, and in the other path only map data is changed. The schema change may be an addition of a field, a deletion of a field, or a modification of a field. The modification may be a change of a field from one purpose to another (e.g., a speed limit field may be replaced by a direction of travel field). The schema change may be an addition of an option within a field, a deletion of an option with a field, or a modification of an option within a field.

Subsequently, a new change in map data is propagated to both the second and third databases, which now have different schemas. The server 125 propagates the second map data change to the third geographic database without the schema change. The server 125 propagates the second map data change to the second geographic database with the schema change. The changes are propagated in accordance of a rule that reconciles the schema differences. When the second map data relates to a field of the schema change, the rule may define how the field is handled. In one example, the field may be set to a constant value. In another example, the field may be set equal to another field that already exists in the first geographic database. In another example, the field may be set equal to a value computed from multiple fields that already exist in the first geographic database.

The databases 123a, 123b . . . 123n may be organized in attributes. The updates in map data change value for the attributes and the updates in schema change the attributes themselves, or selectable options within an attribute. Example attributes include navigable characteristics, cartographic characteristics, visual characteristics, and points of interest. The points of interest include may include business names that are stored in a table in the database. Similarly, the point of interest data may include addresses that are associated with business names stored in a table in the databases. The business names associated with addresses may also include geographic coordinates indicating where in a map to locate the point of interest associated with the business name. The point of interest data may also include names of landmarks that are of particular interest to a user, such as hotels, restaurants, gas stations, stores, shopping centers, landmarks, natural features (e.g., a canyon, or mountain) or other combinations thereof. Additionally, the point of interest may be stored by category rather than business name. The visual characteristics include the graphics and indicators used to draw the other components of the map. The visual characteristics include components, areas, layers, features, text, and/or symbols. The characteristics may be organized as geometric characteristics and non-geometric characteristics. A geometric characteristic is displayed on a map according to one or more coordinates (e.g., longitude and latitude). Non-geometric characteristics describe features (e.g., speed limits, colors, hours of operation, turn restrictions or others).

The navigable characteristics may include locations of road segments or other objects in the database. The navigable characteristics contribute to location selection, route calculation or route guidance. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends.

The road segment attributes include the physical properties of the road or the permitted uses of the road. The physical properties may include a slope, a lane width, or a lane quantity for a road segment. The road attribute may whether a sidewalk or crosswalk is included for travel by pedestrians. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures.

The permitted uses may include any combination of a permitted maneuver, a restricted maneuver, a speed limit, or a vehicle type. The permitted uses may be defined according to functional classification. The functional classification may include arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road. The permitted uses may include data identifying what turn restrictions exist at each of the nodes which correspond to intersections at the ends of the road portion represented by the road segment and the permitted direction of vehicular travel on the represented road segment.

The cartographic characteristics are data structures that relate to land use, natural features, railroads, administrative/political divisions, or other boundaries. The cartographic characteristics or features may include rivers, mountain ranges, lakes, city lines, state boundaries, or any other data shown on the map besides the road network and points of interest.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 3:
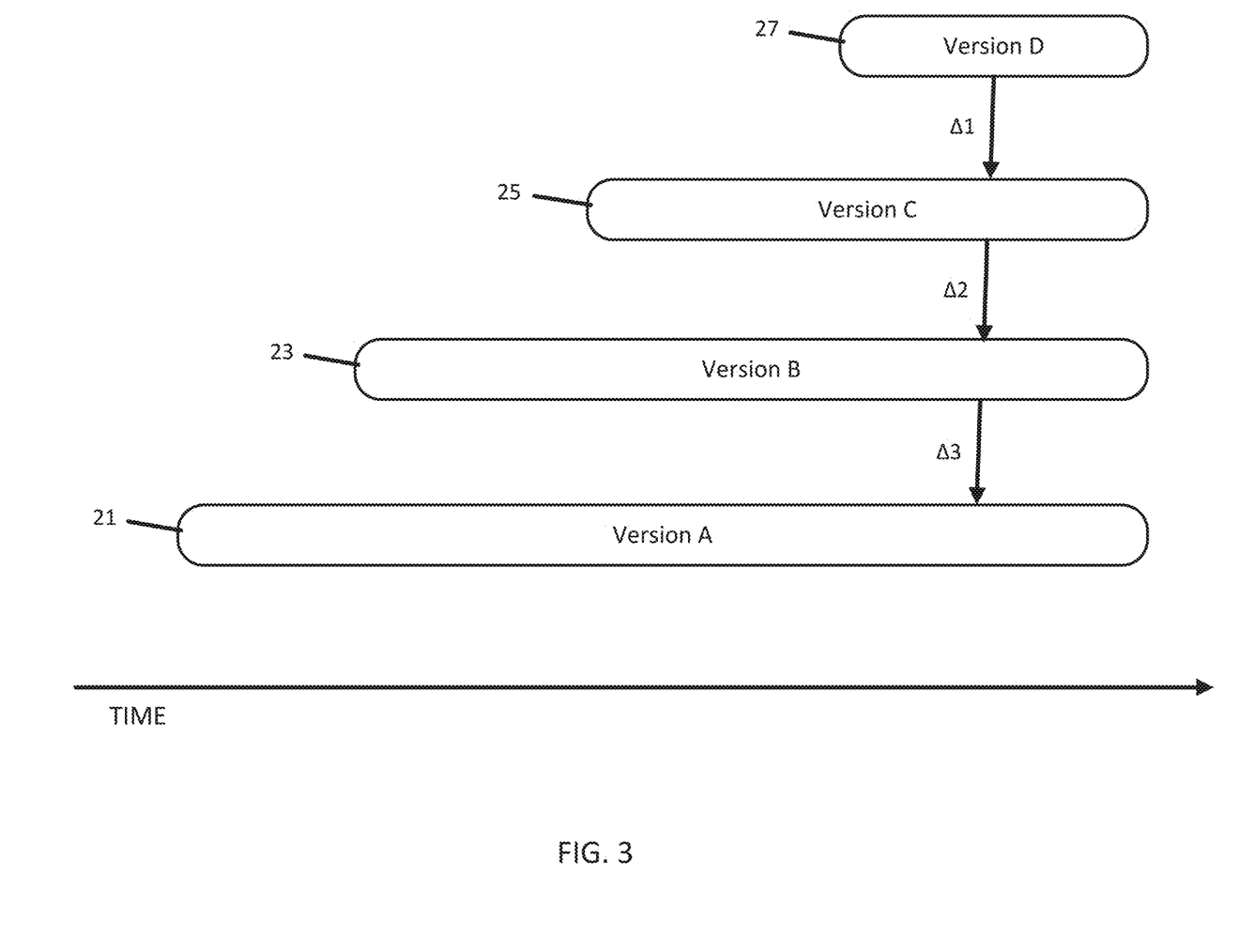
FIG. 3 illustrates an example reverse update flow for versions of a map database.

FIG. 3 illustrates an example reverse update flow for versions of a map database. The versions of the database include versions A, B, C, and D. The series of versions may be referred to as the evolution of the database. The versions may be successive releases made available quarterly or in another time frame. FIG. 3 illustrates the versions of the database along a time axis. Therefore, database 21 was released first, followed by database 23, database 25, and finally, database 27.

The schema may be changed between the database versions. Example schema changes include road attributes that are added. Example road attributes include a speed limit or speed category (i.e., the maximum permitted vehicular speed of travel) on the represented road segment), a road classification (e.g., a rank of a road segment or functional class), turn restrictions, direction of travel, intersection locations, number of lanes, high occupancy restrictions, type of vehicle, the name or names by which the represented road segment is known, the length of the road segment, the grade of the road segment, the street address ranges along the represented road segment, timed restrictions (e.g., no left turn during rush hour), timed direction of travel (e.g., direction changes in time, such as for express lanes), parking zones, school zones, emergency vehicle zones, condition warnings (e.g., ice, wind, or flooding prone areas), or other attributes. Other schema changes may involve points of interest (POI). For example, the schema may specify how POIs are classified (business type) or the types of data associated with POIs (e.g., hours of operation, contact information, reviews, and other information).

Therefore, countless possibilities arise for the schema change between database versions. A new attribute may be added (e.g., include parking zones for the road segments), deleted, replaced or modified. A new option for an attribute may be added (e.g., add parking for the zone attribute that already included school zones and emergency vehicle zones), deleted, replaced or modified.

Consider an example in which database 21 is the original version of the database. A schema change, and possibly other changes are made to the database 21, creating database 23. A schema change, and possibly other changes are made to the database 23, creating database 25. A schema change, and possibly other changes are made to the database 25, creating database 27.

A new intermediate update is applied to database 27. First the server 125 determines whether any of the schema changes affect the intermediate update. For example, if the intermediate update include map data that is applied to a field of the schema change, they are directly related. In addition, if the intermediate update affects an object (e.g., road segment) that is also affected by the schema change, they may be indirectly related.

When the intermediate update and the schema change are related directly or indirectly, the server 125 access a rule to reconcile the schema change and intermediate update. The rule is a set of one or more logical statements that modifies either the schema change or the intermediate update. In one example, the rule may state when the intermediate update (e.g., as applied to database 27) includes map data for a field that is not in the earlier schema (e.g., database 25), that map data is dropped. In another example, the rule may state that when the intermediate update includes map data for an option for a field that is not in the earlier schema, the option may be ignored. In another example, the rule may state that when the intermediate update includes map data for an option for a field that is not in the earlier schema, the new option is mapped to another option.

The server 125 may store a set of rules for a change $\Delta 1$ between the database 27 and the database 25. The set of rules may be generated based on the schema changes that occur between Version C and Version D of the database. Similar sets of rules may be stored for a change $\Delta 2$ between the database 25 and the database 23 and for a change $\Delta 3$ between the database 23 and the database 21. When an intermediate change for map data, the server 125 may first apply the update to Version D, using the current schema. Next, the server 125 may apply rules for the change $\Delta 1$ in order to propagate the update to Version C. Next, the server 125 may apply rules for the change $\Delta 2$ in order to propagate the update to Version B. Finally, the server 125 may apply rules for the change $\Delta 1$ in order to propagate the update to Version A. In this way, updates to a later in time version of the database (Version D) are propagate in reverse to earlier versions of the database (Versions C, B, and/or A).

Changes may also be propagated in a forward direction. Consider an intermediate update applied to Version A. The intermediate update may add a road segment. The server 125 applies the update to Version B. The server 125 accesses a rule that is based on the change $\Delta 3$, or the inverse of $\Delta 3$, that describes the schema change. In this example, the schema change does not affect road segments between Versions A and B.

The server 125 applies the update to Version C. The server 125 accesses a rule that is based on the change $\Delta 2$, or the inverse of $\Delta 2$, that describes the schema change. In this case, a new road attribute is added between Versions B and C. The rule may specify the road attribute is set to 0 or another constant. Thus, the intermediate update for Version A is applied to Version C but with the road attribute set to a constant value. For example, if the new road attribute was a parking zone, the rule may state that any road segments from Versions A and B will be added to Version C with no parking zones (or all parking zones). In another example, the new road attribute may be mapped to another attribute. For example, if the new road attribute was a parking zone, the rule may state that any road segments from Versions A and B will be added to Version C such that all functional classifications of 1, 2 and 3 include no parking zones and all functional classifications of 4 and 5 include parking zones along their entire lengths.

Figure 4:
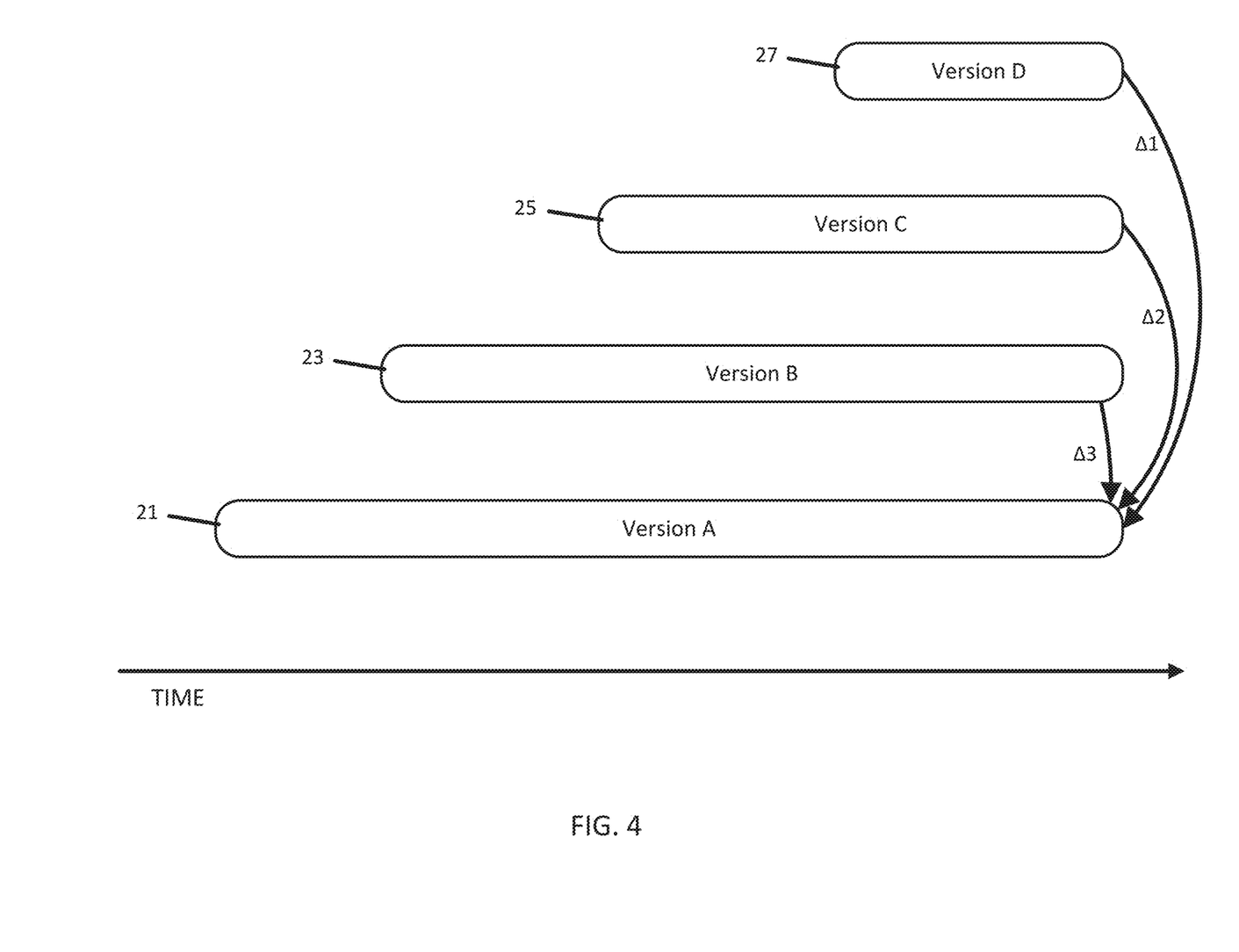
FIG. 4 illustrates another example reverse update flow for versions of a map database.

FIG. 4 illustrates another example reverse update flow for versions of a map database. Rather than the chronological order described in FIG. 3 (changes to Version A are first propagated to Version B then to Version C and so on), the oldest maintained version (Version A) may serve as a baseline for the other versions. Therefore, server 125 may define $\Delta 1$ as the changes between Version D and Version A, $\Delta 2$ as the changed between Version C and Version A, and $\Delta 3$ as the changes between Version B and Version A. Similarly, the server 125 may define rules for handling schema difference between each of the later versions and the baseline versions.

Figure 5:
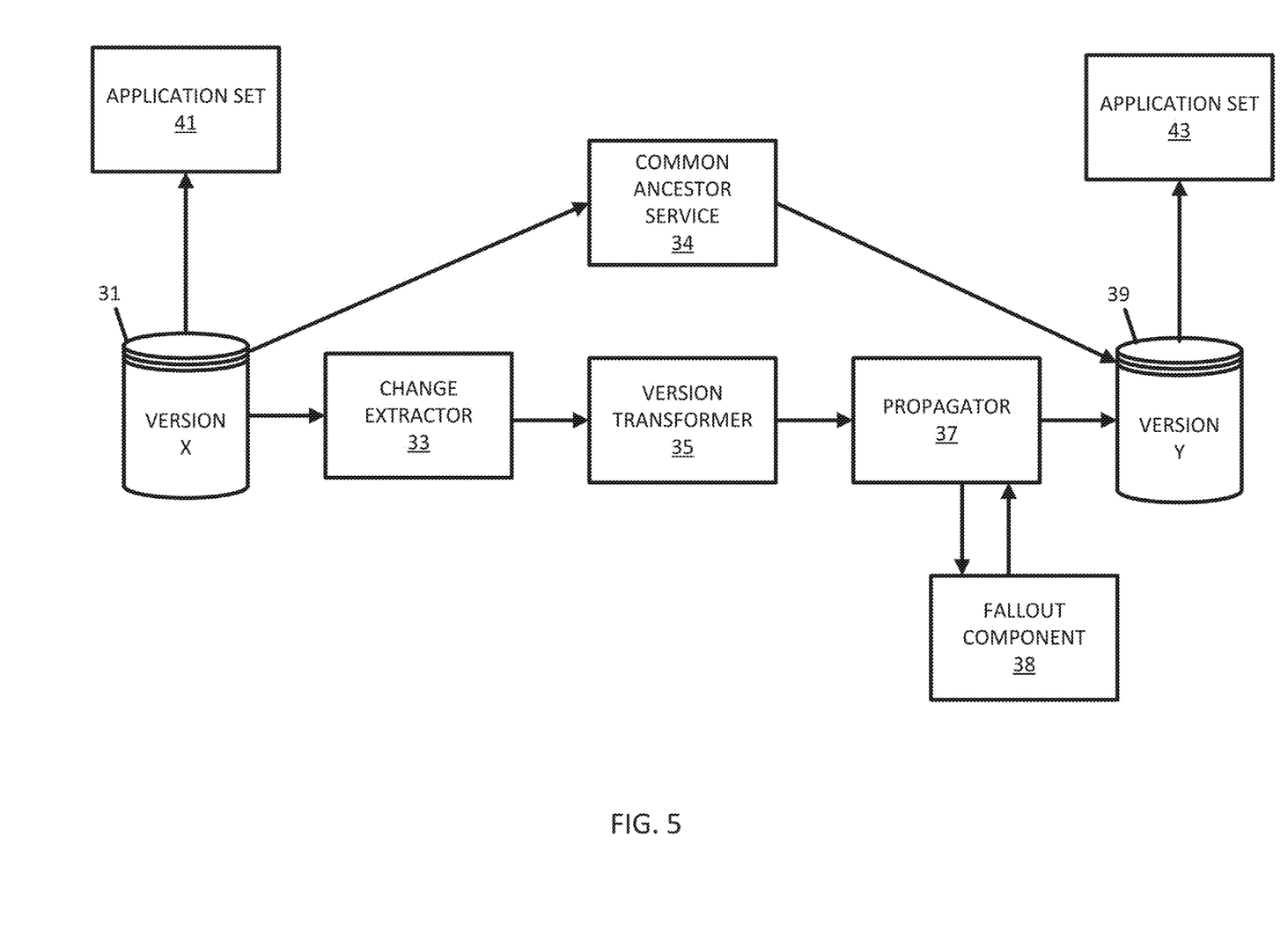
FIG. 5 illustrates an example block diagram for versioned change propagation.

FIG. 5 illustrates an example block diagram for versioned change propagation. The block diagram includes logical or physical components that may be implemented using the server 125 and databases 123*a-n*. The block diagrams analyzes the changes between database versions and generates the rules to reconcile schema changes between database versions. The block diagram includes an application set 41, a first database (Version X) 31, a change extractor, a version transformer 35, a propagator 37, a second database (Version Y) 39, an application set 43, and a fallout 38. Additional, different, or fewer components may be included.

The application sets 41 and 43 include applications that utilize the map data from the databases 31 and 39. The applications may include navigation applications for providing routing instructions from an origin location to a destination location and mapping applications for providing maps the users for exploring an area and viewing routes or locations. The applications may include traffic services for displaying traffic data related to road segments in the map data. The applications may include location based services for providing data to users based on location.

The change extractor 33, which may be implemented in logical hardware components or software components, may be configured to monitor changes in the database 31. For example, as the server 125 applies an update to database 31, the change extractor 33 identifies and records the update.

The version transformer 35, which may be implemented in logical hardware components or software components, may be configured to identify a schema transformation to convert the update for Version X to a format suitable for the new schema (or old schema) in Version Y. Version X may be an earlier or later version of the database with respect to Version Y. The schema transformation may describe the differences in available fields or possible values for those fields in the database. Example fields relate to the speed limit on the road, the length of the road, the width of the road, the address for the road, the directionality of the road, the geometry of the road, existence of restricted driving maneuvers (e.g. no left turn, no U-turn), the functional classification of the road, the priority of the road, the elevation of the road, the type of road, information about road lines, the average speed, the existence of dividers, the surface type, the condition of the road, construction status, road access, segment usage, grade levels, bicycle and pedestrian access, the address range, or other combinations thereof. Additional attributes known in the art may be used.

The propagator 37, which may be implement in logical hardware components or software components, may be configured to apply a rule to the database 39 of Version Y. The propagator 37 may query a conflict table of validation rules. The conflict table lists map objects, attributes, or fields that create potential conflicts between Version X and Version Y. The conflict table may state that all road attributes are potential conflicts. The conflict table may state that specific types of road attributes (e.g., functional class or in certain regions) are potential conflicts. Other designations are possible.

The propagator 37 identifies the potential conflict and sends a message to the fallout component 38. The fallout component 38 may be logical hardware or software that examines the potential conflict and applies a rule to eliminate the conflict. The rule may state that the potential conflict is not important and should be ignored. For example, inconsistencies of naming along road segments of the same highway may be ignored. The rule may state that all attributes in the schema of Version Y that are not included in Version X are set to a default value. The rule may state that an attribute in the schema of Version Y that and not included in Version X is set to another attribute's value. For example, when the added attribute is rush hour speed limit, the fallout component 38 may set the rush hour speed limit to the normal speed limit.

In instances in which no rule applies to the potential conflict. The fallout component 38 may generate an error message. The error message may be displayed on a terminal (e.g., workstation 128) and instruct a user to provide instructions for handling the conflict. The instructions may include selections such as ignore, delete the conflicting data, or modify the conflicting data.

In any of these examples, the fallout component 38 communicates the results of the rule of reconciliation decision back to the propagator 37 which applies the change to the update for the map data of database 39.

In another example, Version X and Version Y may have map data differences. For example, a value of a field in the schema of Version X has been changed to a different value than the same field has been changed in Version Y. For example, consider the example when the Version X and Version Y are both quarterly updates from the same live database. Version X has been modified to update the speed limit of Road 1 to 20, and Version Y has been modified to update the speed limit of Road 2 to 30.

The common ancestor service (CAS) 34, which may be implement in logical hardware components or software components, may be configured to examine the versions histories of the databases to track sequences of changes made to objects or characteristics in the database. The CAS 34 accesses a version history for the two geographic databases identifies first database as a common ancestor or predecessor based on the version history. The common ancestor analysis may be done on the database level, the geographic region level or the object level. Objects are the data structures (e.g., road segments) that include attributes and options. The CAS 34 may trace version histories for Version X and Y of the database to determine when a particular object has all of the same attributes and options.

The CAS 34 identifies a version of the database that is a common predecessor to Version X and to Version Y. For example, referring to FIG. 1B, Live Database 1 is the common ancestor of Live Database 3 and the satellite database. The CAS 34 may identify which of the updates is the new update. The new update may be adopted by the fallout component 38 and propagated into Version Y.

In another example, the CAS 34 may select the older version of an object when the older value is flagged with a confidence value. In one example, the CAS 34 may selected the data associated with a higher version number. In other examples, the CAS 34 may revert to the value in the common ancestor. The CAS 34 may report this information to the fallout component 38 for handling the potential conflicts of the update.

Other types of changes may causes conflicts based on the type of data that is modified. For example, if an odd address is placed on the same side of the road as even addresses, the propagator 38 may identify a potential conflict. The fallout component 38 may resolve the conflict by deleting the odd address, adding a 1 to the odd address, or dispatching an investigation into the address. In another example, a road having a specific functional class may be assigned an inappropriate speed limit (e.g., a highway is assigned a speed limit of 20 miles per hour). The propagator 38 may identify a potential conflict. The fallout component 38 may resolve the conflict by deleting the inappropriate speed limit, averaging an upstream speed limit and a downstream speed limit, or dispatching an investigation into the speed limit.

Consider an example in which the schema for Version Y has five vehicle types available for road segments (e.g., car, truck, pedestrian, carpool only, emergency only). In Version X, the schema has been changed to have size vehicle types available for road segments (e.g., motorcycle is added). A new road segment is added with the vehicle type motorcycle as one of the possible vehicle types for the road segment (e.g., car=1, truck=1, pedestrian=0, carpool=0, emergency=0). The change extractor 33 identifies the update. The version transformer 35 identifies a schema transformation between the databases. In this example, the schema transformation lists the new motorcycle option. The propagator 37 applies a rule to reconcile the schema transformation. The rule may state that the motorcycle option is dropped from the update before adding to Version Y. The rule may state that the motorcycle option is set to the value of the car option in all instances or for certain types of roads.

Figure 6:
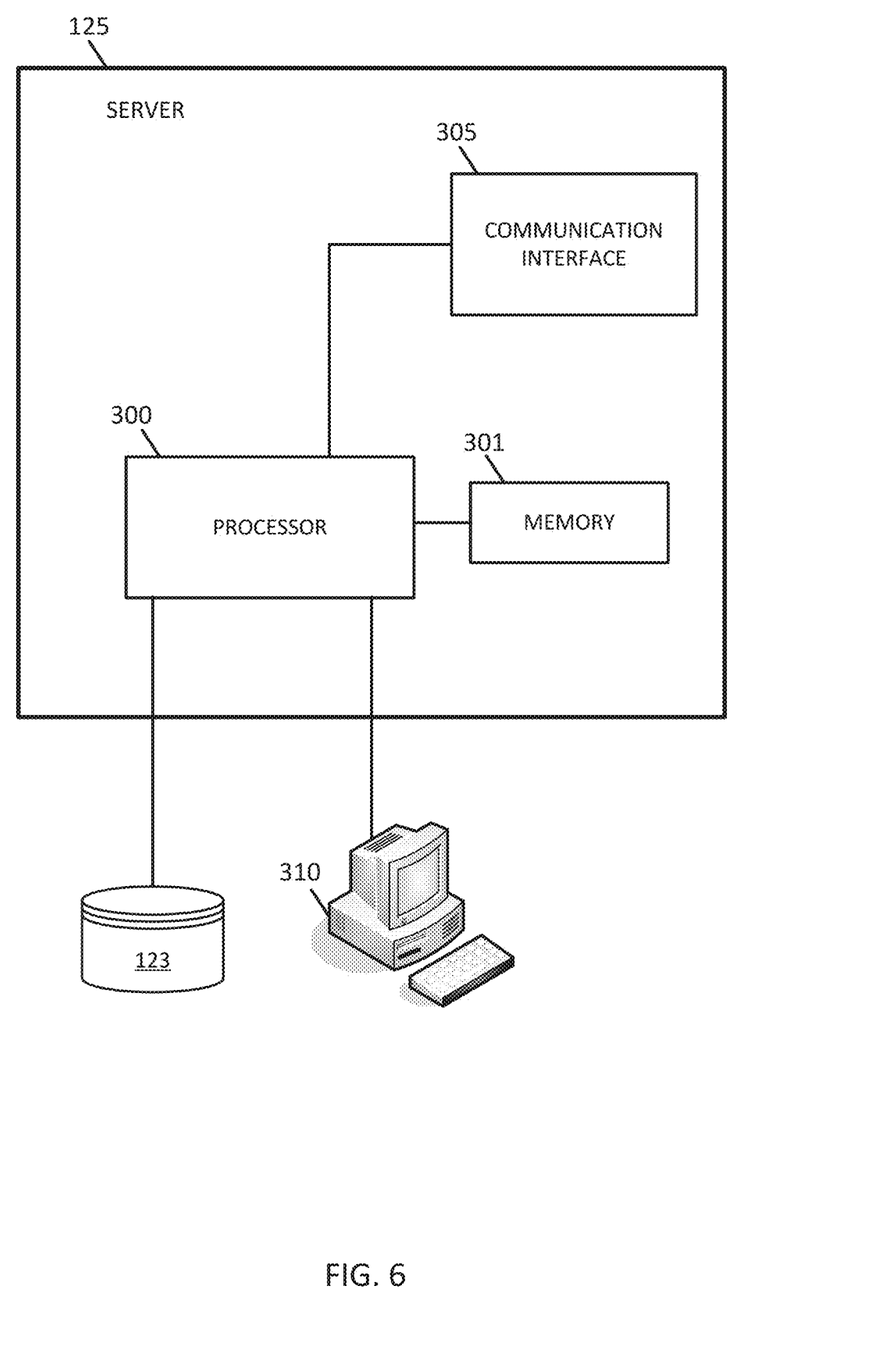
FIG. 6 illustrates an example server of the system for versioned change propagation.
Figure 7:
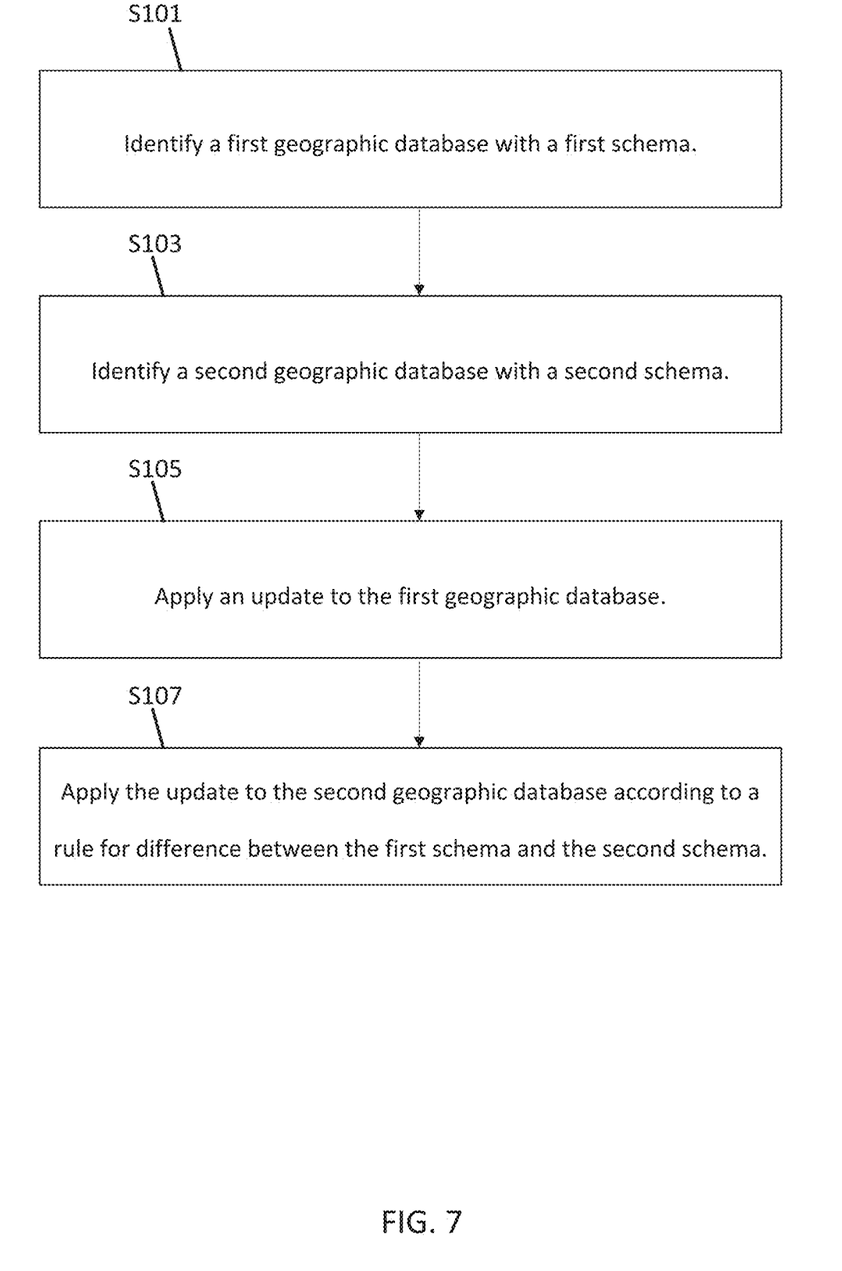
FIG. 7 illustrates an example flowchart for the server of FIG. 6.

FIG. 6 illustrates an example server 125. The server 125 includes a processor 300, a communication interface 305, and a memory 301. The server 125 may be coupled to a database 123 and a workstation 310. The workstation 310 may be used to enter data regarding the updates or changes to the database, the rules for handling schema transformations, or defining the multiple map versions maintained by the database 123. The database 123 may be a geographic database as discussed above. Additional, different, or fewer components may be provided in the server 125. FIG. 7 illustrates an example flowchart for the operation of server 125. Additional, different, or fewer acts may be provided.

In act S101, the processor 300 identifies a first geographic database with a first schema, and in act S103 the processor 300 identifies a second geographic database with a second schema. The first geographic database is a later version of the second geographic database. For example, the first and second databases may descend from a common ancestor, or the first geographic database may descend from the second geographic database. As described above, several scenarios are possible in which two versions of the database exist and are maintained into the future. In some examples, multiple releases are maintained because a different schedule or cadence is preferred for map releases by users. In some examples, a version of the map is under construction for intensive development for a time period than spans multiple versions of the live database.

At act S105, the processor 300 applies an update to the first geographic database. The update may be a high priority update that is released in between map versions. For example, the first and second geographic databases may be quarterly versions that are currently maintained. The high priority update is propagated to all currently maintained versions. The high priority update may be defined according to public safety, a high volume route, or by government regulation. Map updates related to public safety may include any combination of hospital locations and names, airport locations and names, fire stations, police stations, and emergency routes (e.g., snow routes, evacuation routes). High volume routes may include roads that are traveled by a high volume of traffic (e.g., functional classification of 1).

Because the first geographic database is current, no modification are needed to apply the update. That is, the update is designed for the first schema. The update may add points of interest to the first geographic database, change values in attributes of the database, or add attributes to the database.

At act S107, the processor 300 applies the update to the second geographic database according to a rule for difference between the first schema and the second schema. The rule may instructs the processor 300 to delete a portion of the update. The rule may instruct the processor 300 to changes a value for a map attribute included in the update to a default value or according to a set of logic. The set of logic may map the new value to an existing value. The rule may instruct the processor 300 to change the update as a function of a common ancestor database.

The geographic databases 123a-n may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123a may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

Figure 8:
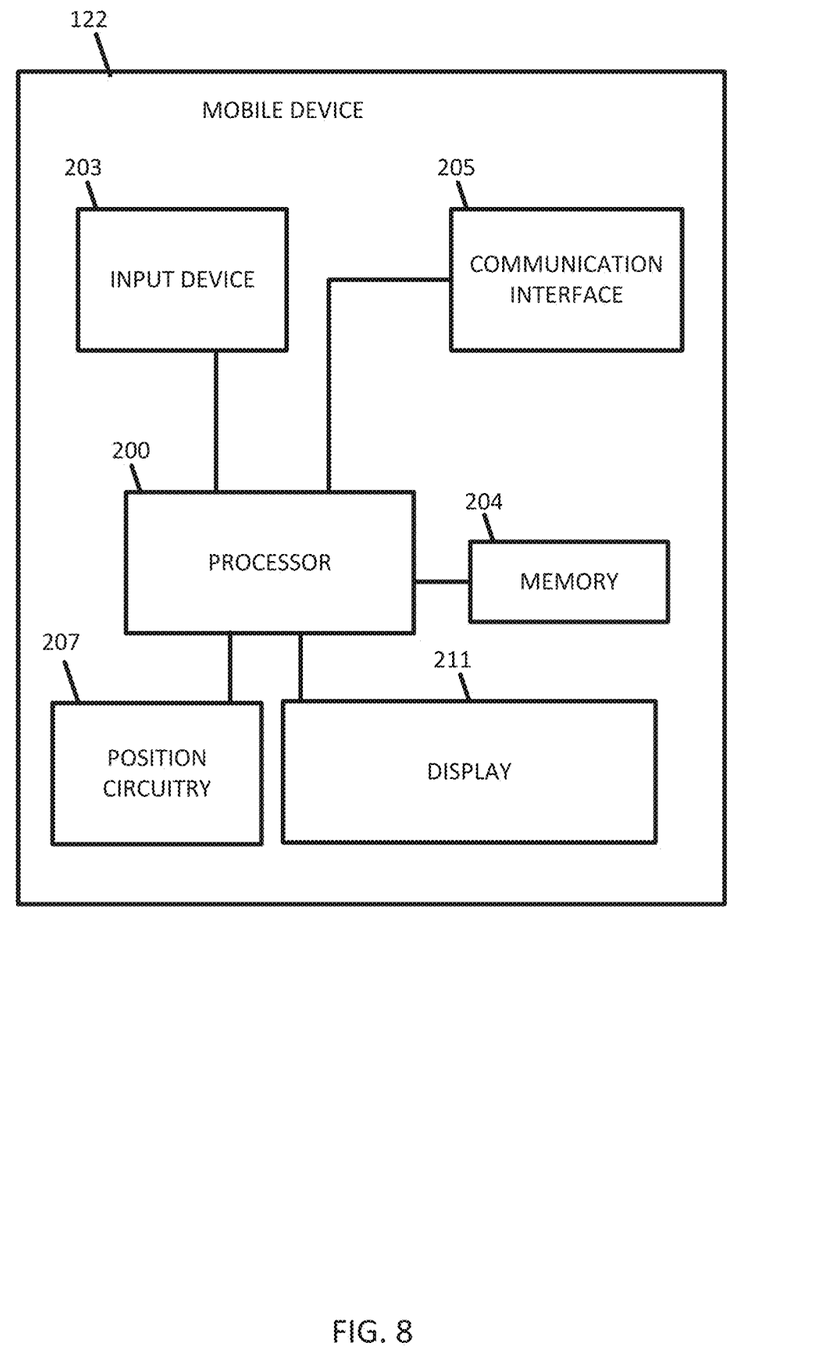
FIG. 8 illustrates an example mobile device in the system for versioned change propagation.

FIG. 8 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device/personal computer 122.

The mobile device 122 (or navigation device 122) is configured to execute routing algorithms to determine an optimum route to travel along a road network from an origin location to a destination location in a geographic region. Using input from the end user, the navigation device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some navigation devices 122 show detailed maps on displays outlining the route, the types of maneuvers to be taken at various locations along the route, locations of certain types of features, and so on.

The navigation device 122 is also configured to execute the update script or other type of navigation patch on local map data. The processor 200 may request updates in response to a user command entered on the input device 203 or receive periodic updates. The navigation device 122 receives the update script from the server 125 by way of network 127. The update script includes less data than a wholesale replacement of the database stored in memory 204. The update script may be stored in a computer readable medium coupled to the server 125 or the navigation device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
identifying, with a processor, a first geographic database;
updating, with the processor, the first geographic database to a second geographic database at a first time with a schema change;
updating, with the processor, the first geographic database to a third geographic database at a second time with a first map data change, wherein the second time is later than the first time;
identifying a second map data change;
accessing a rule that defines how a field in the schema change for the second geographic database is handled in the third geographic database without the schema change;
propagating the second map data change to the third geographic database without the schema change according to the rule; and
propagating the second map data change to the second geographic database with the schema change.

2. The method of claim 1, wherein the schema change is one or more addition or one or more deletion of a map attribute or a map attribute option.

3. The method of claim 2, wherein the map attribute or the map attribute option is a navigable characteristic, a cartographic characteristic, a visual characteristic, or a point of interest characteristic.

4. The method of claim 3, wherein the navigable characteristics includes a maneuver, a speed limit, a vehicle type, a slope, a lane width, or a lane quantity for a road segment.

5. The method of claim 3, wherein the second map data change is a value for the map attribute.

6. The method of claim 1, wherein the rule substitutes a constant value for a field in the schema change.

7. The method of claim 1, wherein the rule substitutes an existing field in the first geographic database to a new field in the schema change.

8. The method of claim 1, further comprising:
propagating the second map data change to a fourth geographic database having a second schema change.

9. The method of claim 1, further comprising:
accessing a version history for the second geographic database and the third geographic database; and
identifying the first database as a common ancestor based on the version history.

10. The method of claim 1, further comprising:
calculating a schema transformation between the second geographic database and the first geographic database.

11. The method of claim 10, further comprising:
identifying a conflict between the first map data change and the second map data change based on the schema transformation; and
modifying the second map data change based on the conflict.

12. An apparatus comprising:
at least one processor; and
at least one memory including computer program code for one or more programs; the at least one memory and the computer program code configured to, with the at least one processor, cause the apparatus to at least perform:
identify a first geographic database with a first schema, wherein the first geographic database is associated with a first update interval;
identify a second geographic database with a second schema, wherein the second geographic database is associated with a second update interval;
apply an update to the second geographic database according to a rule for a difference between the first schema and the second schema, wherein the first schema and the second schema differ by a difference field, wherein the rule substitutes a constant value or an existing field in the second schema for the difference field for the update to the second geographic database; and
apply the update to the first geographic database without the rule for the difference between the first schema and the second schema.

13. The apparatus of claim 12, wherein the rule instructs the processor to delete a portion of the update.

14. The apparatus of claim 13, wherein the rule instructs the processor to change a value for a map attribute included in the update.

15. The apparatus of claim 14, wherein the value is set equivalent to an existing value in the first schema.

16. The apparatus of claim 14, wherein the value is set to a default value.

17. The apparatus of claim 12, wherein the at least one memory and the computer program code configured to, with the at least one processor, cause the apparatus to at least perform:
access a version history for the first geographic database and the second geographic database; and
identify a common ancestor database based on the version history.

18. The apparatus of claim 12, wherein the rule is defined as a function of the common ancestor database.

19. A non-transitory computer readable medium including instructions that when executed are operable to perform:
identifying a first geographic database with a first schema;
identifying a second geographic database with a second schema, wherein the second geographic database is updated at a different interval than the first geographic database;
applying an update to the second geographic database according to a rule for difference between the first schema and the second schema, wherein the first schema and the second schema differ by a difference field, wherein the rule substitutes a constant value or an existing field in the second schema for the difference field for the update to the second geographic database; and
applying the update to the first geographic database without the rule for the difference between the first schema and the second schema.

* * * * *